United States Patent [19]
Demay et al.

[11] Patent Number: 5,903,318
[45] Date of Patent: May 11, 1999

[54] DEVICE AND METHOD FOR DETERMINING A KEY FOR CLIPPING A SUBJECT MOVING AGAINST A COLORED BACKGROUND

[75] Inventors: Alain Demay, Sartrouville; Michel Le Lan, Cergy St. Christophe, both of France

[73] Assignee: Thomson Broadcast Systems, Cergy Pontoise Cedex, France

[21] Appl. No.: 08/755,645

[22] Filed: Nov. 25, 1996

[30] Foreign Application Priority Data

Nov. 23, 1995 [FR] France .................................. 95 13953

[51] Int. Cl.⁶ ...................................................... H04N 9/75
[52] U.S. Cl. .......................... 348/592; 348/586; 348/587; 348/588; 345/118; 345/168; 358/537; 358/538; 358/540; 358/22 CK; 382/284
[58] Field of Search ..................................... 348/587, 590, 348/591, 592, 593, 586, 588, 584, 585; 358/22 CK, 537, 538, 540; 345/113, 114, 168, 118, 150; 382/284; H04N 9/75

[56] References Cited

U.S. PATENT DOCUMENTS

| | | | |
|---|---|---|---|
| 5,003,491 | 3/1991 | Heckt | 364/518 |
| 5,051,828 | 9/1991 | Chaplin | 348/590 |
| 5,117,283 | 5/1992 | Kroos | 348/586 |
| 5,202,762 | 4/1993 | Fellinger | 348/586 |
| 5,355,174 | 10/1994 | Mishima . | |
| 5,574,511 | 11/1996 | Yang | 348/586 |
| 5,657,395 | 8/1997 | Hirota | 382/163 |

FOREIGN PATENT DOCUMENTS

| | | |
|---|---|---|
| 0 014 665 | 2/1980 | European Pat. Off. . |
| 0 224 973 | 8/1980 | European Pat. Off. . |
| 0 074 824 | 9/1982 | European Pat. Off. . |
| 4017878 A1 | 12/1981 | Germany . |
| 4217686 A1 | 1/1993 | Germany . |
| WO 91/05443 | 4/1991 | WIPO . |

OTHER PUBLICATIONS

Digital Chroma–Key, by V. G. Devereux, BBC Research Department, UK, Sep. 21–25, 1984, International Broadcasting Convention, pp. 148–152.

*Primary Examiner*—John K. Peng
*Assistant Examiner*—Wesner Sajous
*Attorney, Agent, or Firm*—Oblon, Spivak, McClelland, Maier & Neustadt, P.C.

[57] ABSTRACT

The invention relates to a method for determining a key KD for clipping a subject moving against a colored background, the said key making it possible to separate the color space into three regions, a first region defining a volume representing the colored background, a second region defining a volume representing the subject and a third region defining a transition region between the colored background and the subject, where the device and method defines the volume representing the colored background in the form of a cone of aperture angle α whose axis of symmetry (W) passes through the achromic and zero-luminance point of the color space and a point representing the color of the colored background. The invention also relates to any type of electronic apparatus implementing the abovementioned device and method, such as video mixers or autonomous devices for clipping and overlaying video images.

25 Claims, 9 Drawing Sheets

DEVICE AND METHOD FOR DETERMINING A KEY FOR CLIPPING A SUBJECT MOVING AGAINST A COLORED BACKGROUND

This application is related to copending patent application, Ser. No. 08,755,632, entitled "DEVICE AND METHOD FOR PROCESSING A SIGNAL WITH A SUBJECT MOVING AGAINST A COLORED BACKGROUND", filed herewith, which is incorporated herein by reference.

BACKGROUND OF THE INVENTION

1. Field of the Invention

The present invention relates to a device and method for determining a key used to clip a subject moving against a colored background in such a way as to be able to overlay the subject onto a new colored background. Thus, the device and method relate to any electronic device that incorporates the inventive device and method such as, for example, video mixers or autonomous devices for clipping or overlaying video images commonly referred to as "chroma-keyers". Such electronic devices or apparatuses are used, for example, in television studio equipment.

2. Discussion of the Background

Conventional systems use a clipping key to demarcate a subject video (i.e., a source image having a subject moving over a colored background) that is to be clipped from a source image as closely as possible so as to preserve the greatest detail of the subject. Examples of such details include individual hairs on a person's head, transparency of a person's glasses, or smoke from a cigarette.

The clipping key is used to distinguish between the colored background of the subject video and the subject itself. Employing the clipping key first requires that a color-luminance space (i.e., a color space) be defined so that a volume within the color space can be defined as containing the colored background. Once the volume is defined, the subject may be extracted from the colored background in order to overlay the subject against a new background.

FIG. 1 represents a conventional approach for defining a volume of the colored background in the color space. In FIG. 1, each pixel M(n) of index n of the colored background is represented by luminance component, yn, a red color difference chrominance component, crn, and a blue color difference chrominance component, cbn, of the pixel M(n). For convenience, in what follows, the color difference chrominance components will be referred to as chrominance components. Mean values y0, cb0, cr0 of each component of the colored background may then be written as follows:

$$y0 = 1/N \sum_{j=1}^{N} i$$

$$cb0 = 1/N \sum_{j=1}^{N} cbj$$

$$cr0 = 1/N \sum_{j=1}^{N} crj$$

where N is the number of pixels of the colored background corresponding to an acquisition window pointing at all or part of the colored background.

In the plane (CB, CR), the calculation of euclidian distance $\rho_n$ of a pixel of index n from the point cb0, cr0 is given by the relation:

$$\rho_n = \sqrt{(crn - cr0)^2 + (cbn - cb0)^2}$$

Two thresholding operations, one in the plane (CB, CR) and the other along the axis Y then make it possible to define the region of discrimination between background and subject. Thus, any point whose luminance value is between the extreme values ymin and ymax and whose euclidian distance is less than a value $\rho_1$ belongs to the colored background 1.

Similarly, any point whose luminance value is between the values ymin and ymax and whose euclidian distance $\rho_n$ is greater than a value $\rho_2$, itself greater than $\rho_1$, belongs to the subject 3. Finally, any point whose luminance value is between the values ymin and ymax and whose euclidian distance $\rho_n$ is between $\rho_1$ and $\rho_2$ belongs to an intermediate transition region 2.

Adjustment of the contents of the image proves to be difficult with such a volume approach and the cylindrical shape of the volume described in FIG. 1 has numerous drawbacks. For example, it is difficult to process overly strong variations in the luminance of the colored background without affecting the luminance of the subject. Similarly, pixels repre senting a shadow cast by the subject cannot be incorporated into the volume of the colored background. It follows that any processing of the shadow proves to be impossible.

SUMMARY OF THE INVENTION

A ccordingly, one object of this invention is to provide a novel device and method for determining a key for clipping a subject moving against a colored background that overcomes the above-mentioned limitations of existing methods and systems.

Another object of the invention is to provide a device and system that defines a new approach for defining a volume of the colored background so as to best preserve the details of the subject when the subject is clipped and subsequently overlaided in the new colored background.

According to the present invention, a key, KD, for clipping a subject moving against a colored background, is determined so as to separate a color space into three regions. A first region defines a volume representing the colored background, a second region defines a volume representing the subject, and a third region defines a transition region between the colored background and the subject. The present invention includes operators that define the volume representing the colored background in the form of a cone of aperture angle α whose axis of symmetry passes through an achromic and zero-luminance point of the color space and a point representing the color of the colored background.

A device according to the present invention includes an operator for calculating a key for clipping the subject moving against a colored background, where the key makes it possible to separate the color space into the three regions. The operator calculates the coordinates of each pixel of the color space in a frame of reference (U, V, W), where the frame of reference (U, V, W) is a right-handed trihedral whose center is the achromic point of zero luminance and whose axis, W, points towards a point of color of the colored background. The device includes another operator that determines the volume representing the colored background in the form of a cone of aperture angle α having the axis W as the axis of symmetry.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
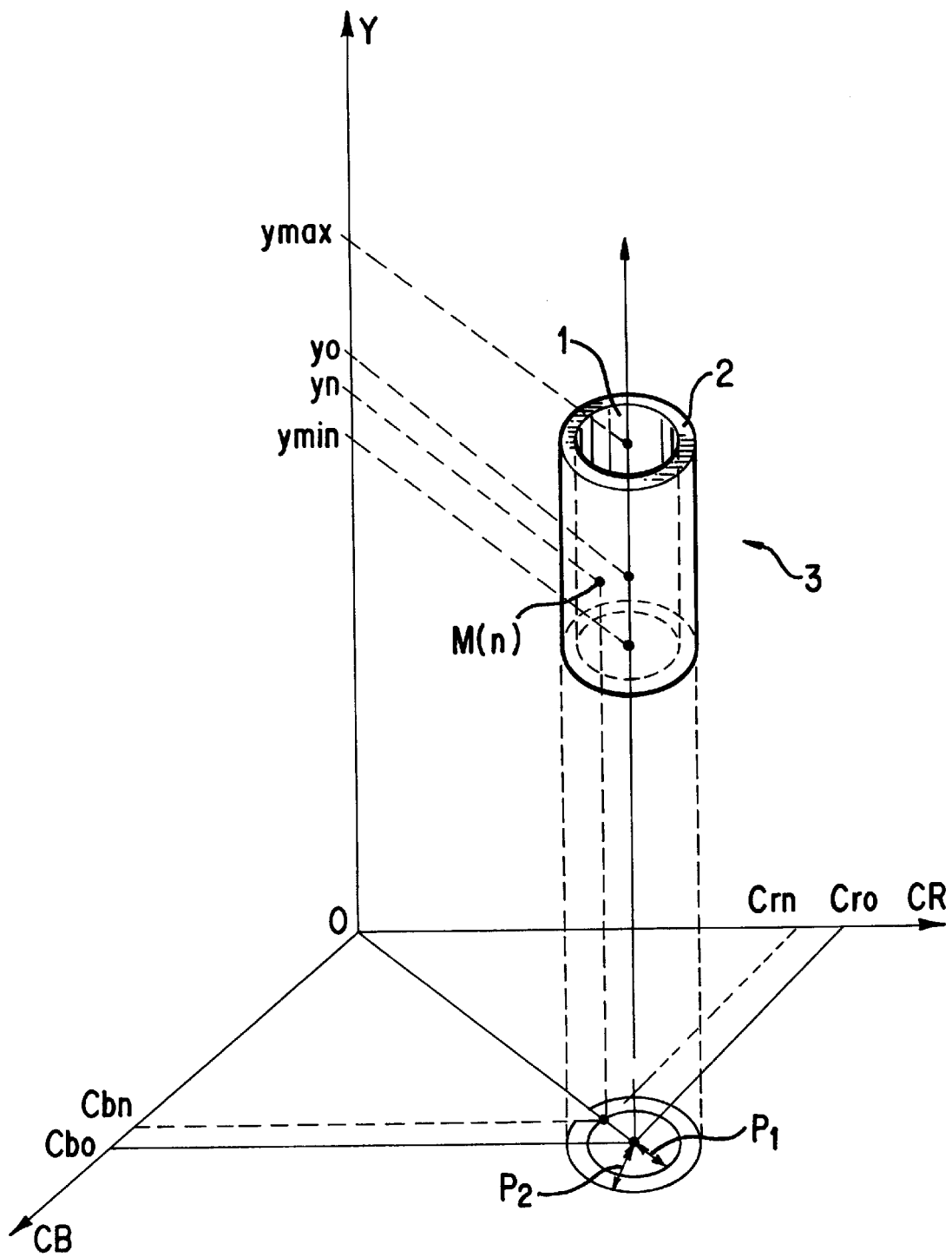
FIG. 1 is a three dimensional graph showing a volume of a colored background according to the relevant art.
Figure 2A:
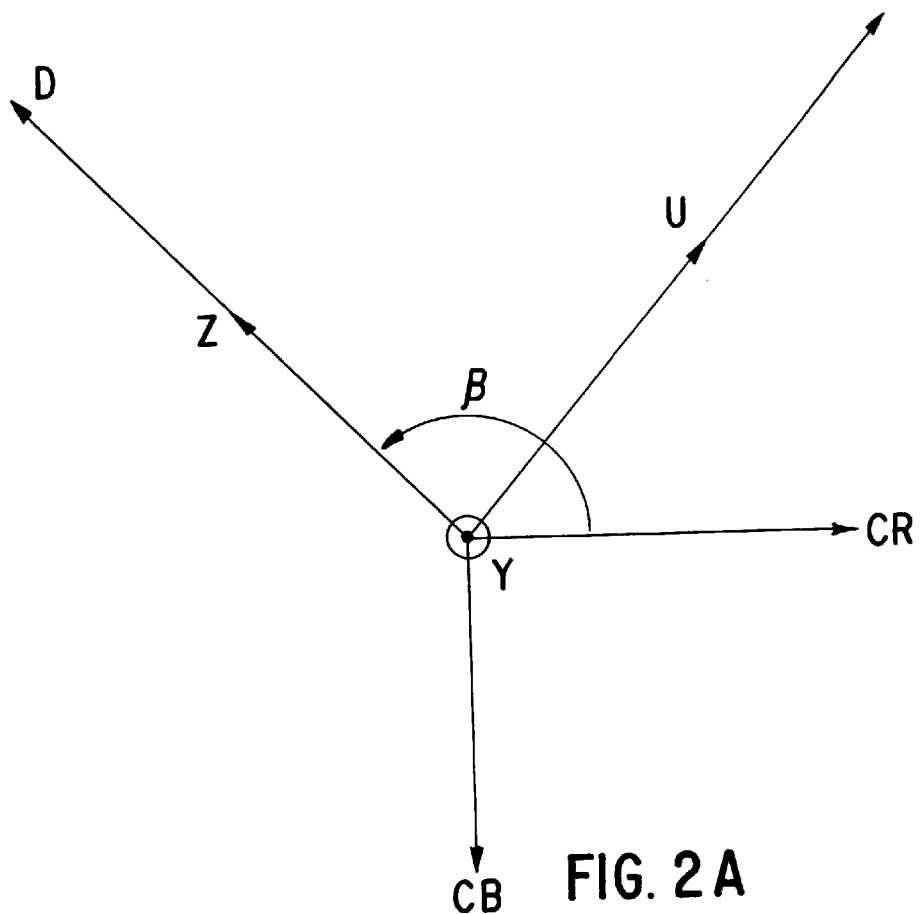
FIGS. 2a and 2b are graphs showing geometrical transformations of a reference frame(CB, CR, Y) to a new reference frame (U, V, W) of the color space which facilitates the defining of the volume of the colored background according to the present invention.

Referring now to the drawings, wherein like reference numerals designate identical or corresponding parts throughout the several views, and more particularly to FIG. 2a thereof, there is illustrated a graph showing a rotation of the plane (CB, CR) with zero luminance (Y=0) around the axis Y. The angle of rotation $\beta$ is such that the axis CR becomes the axis Z which points in the direction D towards the hue of the color of the colored background. With the aid of this same rotation $\beta$, the axis CB becomes the axis U perpendicular to the axis Z such that the trihedral (U, Z, Y) is a right-handed trihedral. This change of frame of reference can be expressed in matrix form by the relation:

$$\begin{pmatrix} u \\ z \end{pmatrix} = \begin{pmatrix} \cos(\beta)\sin(\beta) \\ -\sin(\beta)\cos(\beta) \end{pmatrix} \begin{pmatrix} cb \\ cr \end{pmatrix}$$

where cb and cr are the components of a point of the color space along the axes CB and CR where u and z are the components of this same point along the axes U and Z.

Figure 2B:
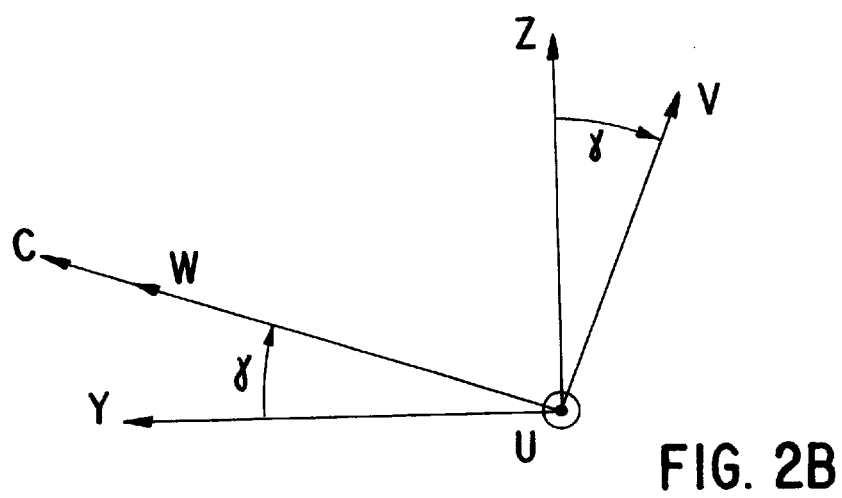

FIG. 2b represents a rotation of the plane (Z, Y) around the axis U. The angle of rotation $\gamma$ is such that the axis Y becomes the axis W which points in the direction C towards the color of the colored background. With the aid of this same rotation, the axis Z becomes the axis V perpendicular to the axis W such that the trihedral (U, V, W) is a right-handed trihedral.

This change of frame of reference can be expressed in matrix form by the relation:

$$\begin{pmatrix} w \\ v \end{pmatrix} = \begin{pmatrix} \cos(\gamma)\sin(\gamma) \\ \sin(\gamma) - \cos(\gamma) \end{pmatrix} \begin{pmatrix} z \\ y \end{pmatrix}$$

where z and y are the components of a point of the color space along the axes Z and Y and where w and v are the components of this same point along the axes W and V.

Figure 3:
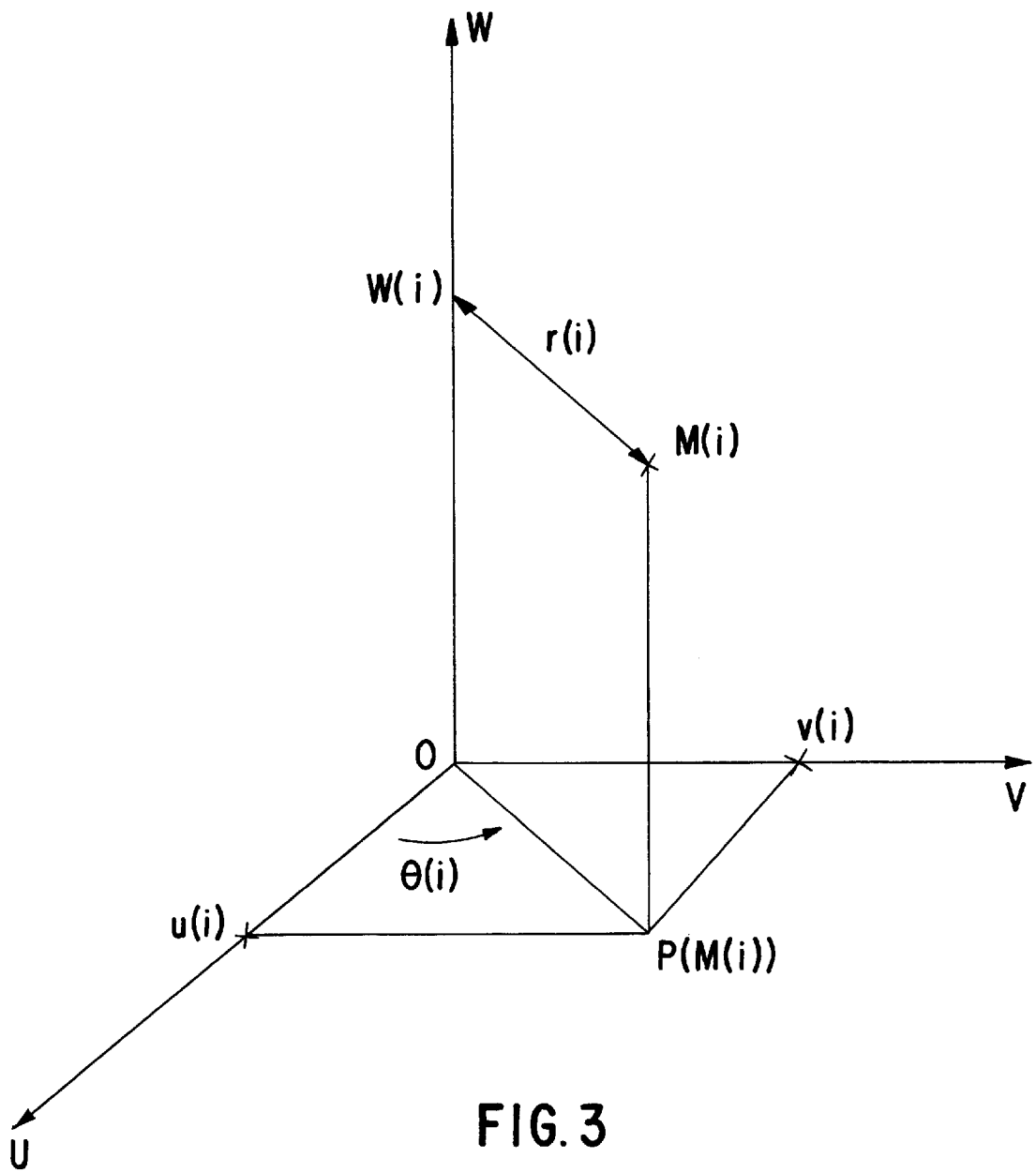
FIG. 3 is a graph of a pixel of the color space in the new reference frame (U, V, W)

FIG. 3 represents a pixel of the color space in the new reference frame (U, V, W) constructed according to the transformations shown in FIGS. 2a and 2b.

The pixel M(i) has a component along each of the three axes U, V, W (i.e. components u(i), v(i), w(i) respectively).

The cylindrical coordinates of the point M(i) in the frame of reference (U, V, W) are r(i), $\theta$(i) and w(i). It follows that:

$$r(i) = \sqrt{u(i)^2 + v(i)^2}$$

and $$\theta(i) = (\vec{U}, \vec{OP(Mi)})$$

where the point P(Mi) is the projection of the point M(i) onto the plane (U, V).

In the remainder of the description, the distance r(i) will be referred to as the chrominance distance of the point M(i) with respect to the axis W.

Figure 4:
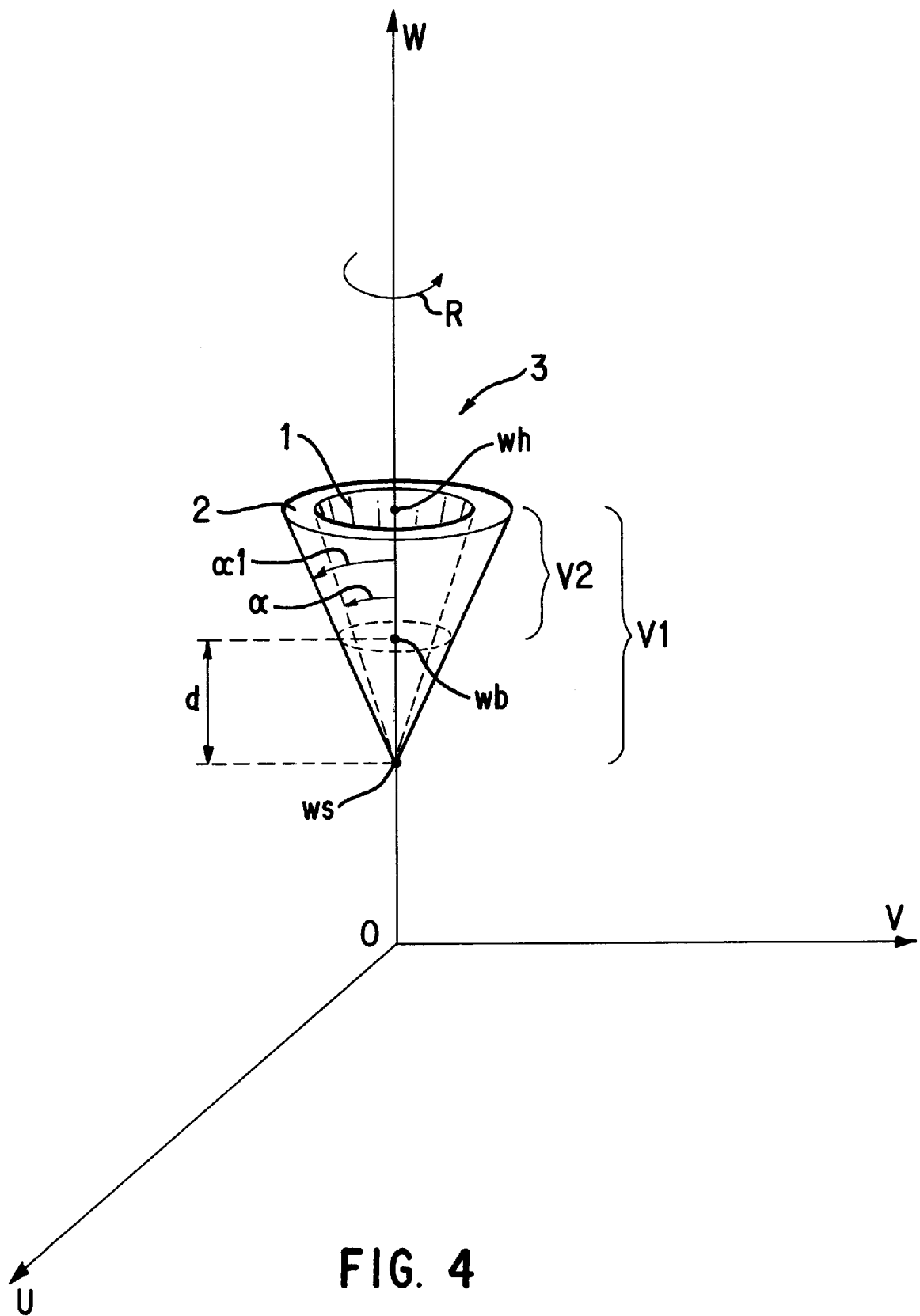
FIG. 4 is a graph that represents the volume of the colored background according to the present invention.

FIG. 4 represents the volume approach of the colored background according to the invention, where the volume which represents the colored background has the shape of a complete cone (volume V1) or truncated cone (volume V2) in the color space referenced with respect to the new frame of reference (U, V, W) deduced from the frame of reference (CB, CR, Y) via the geometrical transformations described in FIGS. 2a and 2b. The color space is divided into three regions, as before: region 1 which represents the colored background, region 3 which represents the subject and region 2 which represents the transition between the subject and the colored background.

The cone representing the colored background is defined by an angular aperture $\alpha$, a vertex situated at the abscissa ws on the axis W, and an elliptical or circular cross-section. A high luminance threshold, of abscissa wh greater than ws on the axis W, makes it possible to define the face opposite the vertex of the cone. A low luminance threshold, of abscissa wb situated between ws and wh on the axis W, makes it possible to define the truncated face situated at the distance d from the vertex with the abscissa ws. The abscissa wb can coincide with the abscissa ws. According to the invention, the cone can turn through an angle R varying from 0 to $\pi$ around the axis W.

The transition region 2 is defined by the space included between the surface of the cone of aperture $\alpha$ and the surface of a cone of aperture $\alpha$1 greater than $\alpha$, with the same axis of symmetry and the same vertex as the cone of aperture $\alpha$ and whose face opposite the vertex of the cone is in the same plane as the face opposite the vertex of the cone of aperture $\alpha$.

The third region 3, representing the subject, is defined by the space situated beyond the cone of aperture $\alpha$1.

Figure 5:
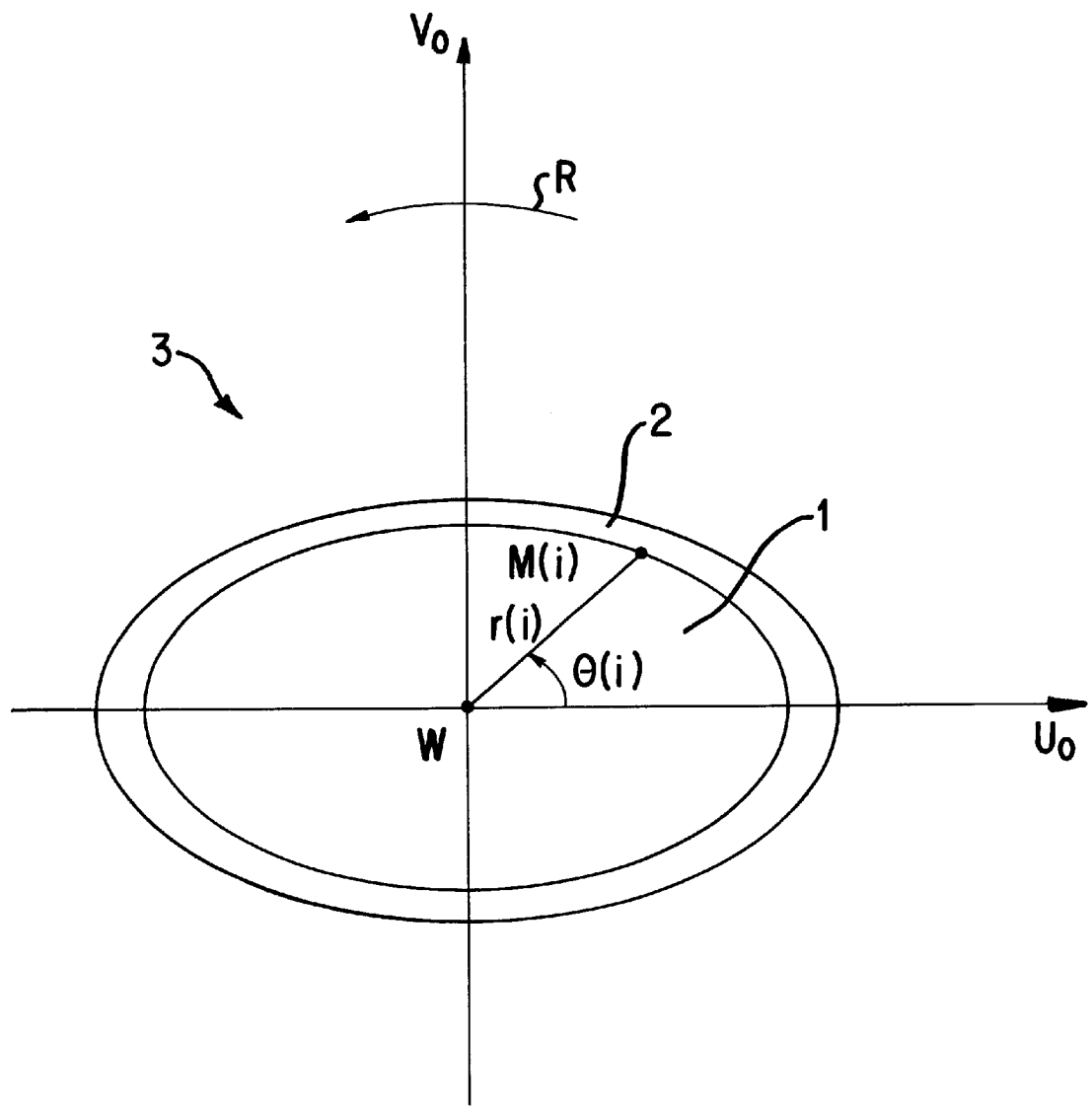
FIG. 5 is a graph of a section of the volume of the colored background of the present invention, where the section is taken through a plane perpendicular to a first axis of the new reference frame.

FIG. 5 represents the sectioned view of the volume of the colored background of the invention through a cross-sectional plane (Uo, Vo) of the cone. This sectioned view shows an elliptical section which is capable of turning around the axis W through an angle R as mentioned above. The coordinates r(i) and $\theta$(i) of each pixel M(i) delimiting the colored background are then linked by the equation:

$$k^2 r(i)^2 \cos^2(\theta(i)+R) + r(i)^2 \sin^2(\theta(i)+R) = \text{constant},$$

where a modulation of the parameter k allows distortion of the ellipse. According to the present invention, the elliptical modulation of the chrominance distance allows for the possibility of producing a circle in the case in which k=1. Preferentially, k varies between 1 and 2, and the value of R can vary from 0 to $\pi$. Advantageously, this modulation technique makes it possible to increase the selectivity of the volume defining the colored background. By way of example, the technique of elliptical modulation associated with the rotation R allows a sharp improvement in respect of reproducing the transparency of a person's glasses.

Figure 6:
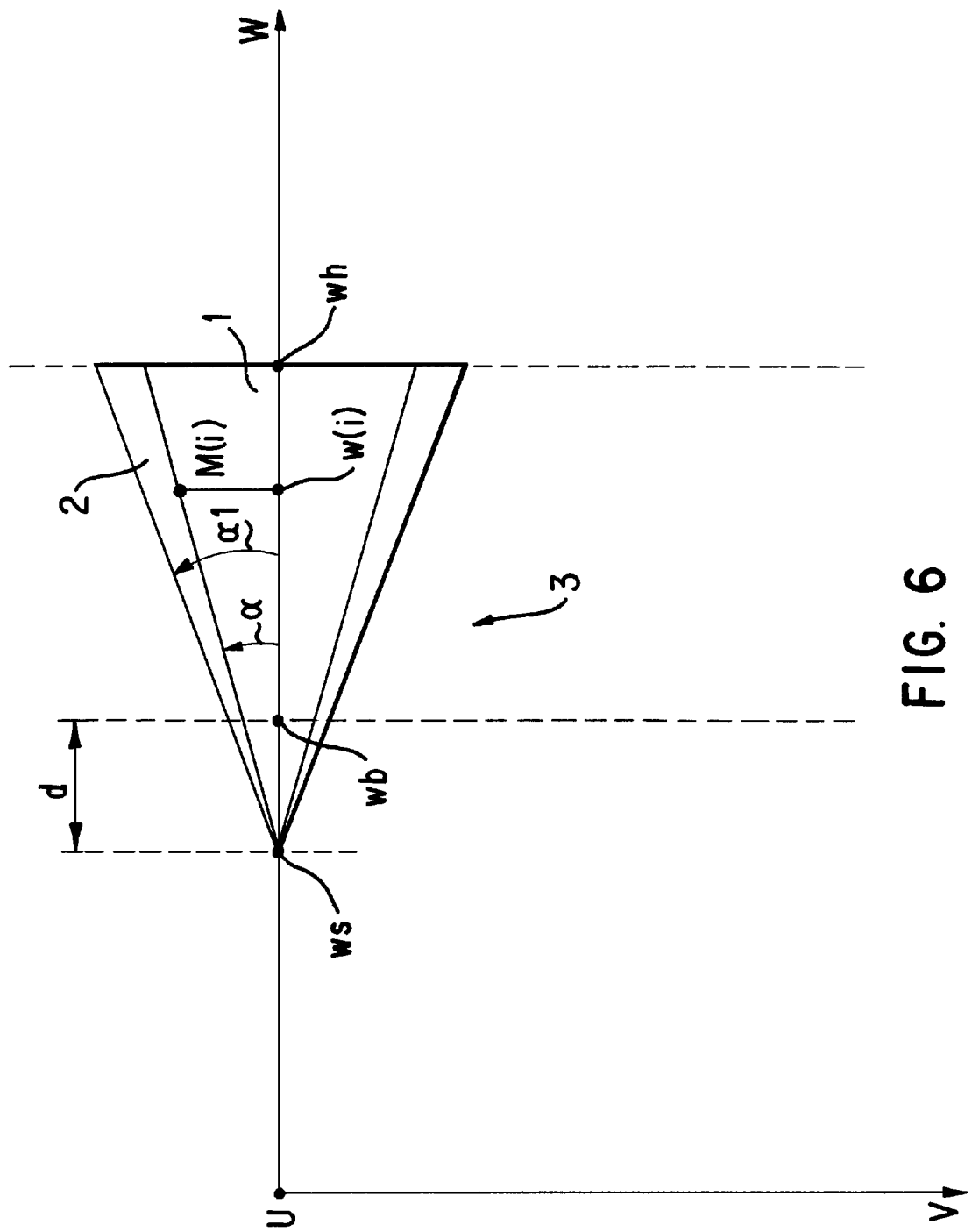
FIG. 6 is a graph showing a section of the volume of the colored background of the present invention, where the section is taken through a plane perpendicular to a second axis of the new reference frame.

FIG. 6 represents a sectioned view of the volume of the colored background of the invention through a plane passing through the major axis of the ellipse and the vertex of the cone. According to the present invention, the conical volume is defined in such a way that the elliptically modulated chrominance distance, denoted $r_e(i)$, the angle of aperture $\alpha$ of the cone and the coordinate $w(i)$ of the point whose chrominance distance is $r_e(i)$ are linked by the equation:

$$r_e(i) - \alpha w(i) = \text{CLIP}$$

where CLIP is a parameter whose variation makes it possible to bring around the displacement of the ordinate ws of the vertex of the cone on the axis W. By way of example, the range of variation of the angle $\alpha$ is between 0 and 45°. The conjugate action of the parameters $\alpha$ and CLIP advantageously allows modulation of the definition of the colored background, and therefore of the subject to be processed. For a zero thresholding value ws, the whole of the clipped volume drops to the black plane.

The variation in the abscissa ws makes it possible to incorporate, into the volume which defines the colored background, points of greater or lesser luminance having the hue of the colored background. Advantageously, it is then possible to take into account nonuniform colored backgrounds whose luminance varies to the eye in a not insignificant manner. As was mentioned earlier (with reference to FIG. 4), the cone can be truncated at a distance d in the case in which wb is different from ws.

The parameter CLIP makes it possible to calculate the chrominance key KC. Any point of the image whose chrominance distance is less than the value CLIP belongs to the colored background 1 and possesses a zero chrominance key KC.

The transition region 2 is associated with the thresholding of the chrominance distance and allows for gradual transfer between the background and the subject. The size of the transition region can be altered via an adjustment parameter termed GAIN. For this purpose, the parameter GAIN makes it possible to calculate the distance separating the points belonging to the cone of aperture $\alpha 1$ from those belonging to the cone of aperture $\alpha$. Any image point situated in region 3, beyond the transition region 2, belongs to the subject and has a chrominance key value KC equal to 1.

All the points with abscissa $w(i)$ less than wb have a luminance key KL equal to 1. All the points with abscissa $w(i)$ greater than wh have a luminance key KL equal to 0. All the points with abscissa $w(i)$ situated between wb and wh are within the luminance-transition region.

The generation of the clipping key KD for the colored background is preferably carried out by virtue of the combining of the chrominance key KC and the luminance key KL. Thus, for each of the points of the image, calculation of the maximum of the two keys allows the construction of the volume defining the colored background; it follows that:

$$\text{KD} = \text{MAX} [\text{KC}, \text{KL}].$$

Figure 7:
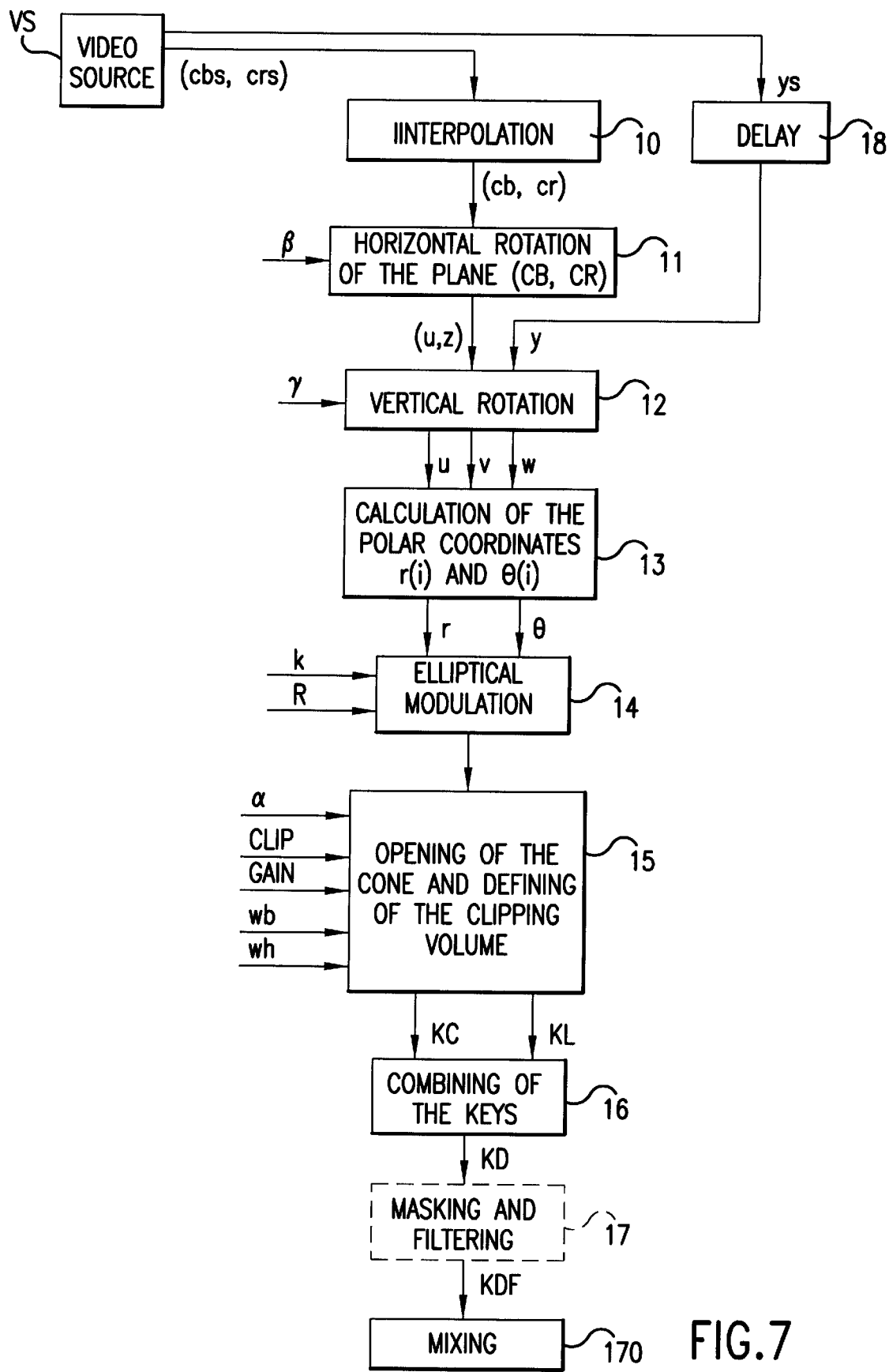
FIG. 7 is a block diagram of a device according to the present invention that calculates the clipping key.

FIG. 7 is a block diagram of a device showing how the clipping key according to the present invention is calculated as was earlier described with reference to FIGS. 2a and 2b through FIG. 6. The functions performed in each of the operators of FIG. 7 (as well as for FIG. 8) are preferably implemented as a computer-based process, where the computer contains a microprocessor, data bus and address bus, RAM, ROM, peripheral I/O ports, network terminal, and local mass storage, such as is available in the BRAVO LC 4/66C personal computer available from AST corp. Appropriate software coding can readily be prepared by skilled programmers based on the teachings of the present disclosure, as will also be apparent to those skilled in the relevant art(s). Alternatively, the operators of FIGS. 7 and 8 may be executed with digital logic, application specific integrated circuits, programmable logic devices, etc.

In FIG. 7, each pixel of the source video, VS, includes three components cbs, crs, ys in the color space referenced by the frame (CB, CR, Y). The luminance and chrominance data are provided in the format 4:2:2. The sampling frequency for the luminance components is 13.5 MHz whilst that for the chrominance components is 6.75 MHz (that is 4 luminance samples for two chrominance samples for each two chrominance components). So as to convert the chrominance components cb1, cr1 into a 4:4 format, the respective samples are interpolated by an interpolation operator 10. Preferably, the chrominance components of the pixels of the source video VS are suppressed during line blankings so that the interpolated components situated at the start and at the end of a line are not disturbed by the line blanking signal.

Cues relating to the chrominance components cbs and crs are of integer type. In order to simplify the interpolation calculation, an achromic level which corresponds, for example, to the level 512 for a video signal coded on 10 bits is converted into an arithmetic zero by inverting a value of a high-order bit. By way of example, the interpolation can be carried out on 55 color difference points so as to obtain a very high calculation accuracy. At the output of the interpolator 10, the components cb and cr are coded with a number N of bits greater than the number of bits of the video. Thus, for a video signal coded on 10 bits at the input of the interpolator, the dynamic range of the samples cb, cr obtained at the output of the interpolator can, for example, be coded on 16 bits among which are the 10 bits of the video, 4 splitting bits intended to define the accuracy of the video, 1 sign bit and 1 overflow bit.

The chrominance components cb and cr arising from the interpolation calculation are transformed into chrominance components u and z by a horizontal rotation operator 11 of angle $\beta$ as was described with respect to FIG. 2a.

The horizontal rotation is carried out in two stages. In a first stage, the microprocessor loads cues $\sin(\beta)$ and $\cos(\beta)$ (or alternatively the microprocessor loads the cue $\beta$, and the horizontal rotation operator 11 calculates $\sin(\beta)$ and $\cos(\beta)$) during field blanking. Subsequently, a multiplier in the horizontal rotation operator 11 calculates the products $cr \times \cos(\beta)$, $cr \times \sin(\beta)$, $cb \times \cos(\beta)$, and $cb \times \sin(\beta)$, for each point of the image, during the active field. The cues cr and cb are originally made available at the frequency of 13.5 MHz, while the cues $\cos(\beta)$, $\sin(\beta)$ are made available at the frequency of 27 MHz. It follows that at the output of the multiplier the cues are multiplexed at the frequency of 27 MHz.

In a second stage, the multiplexed cues are demultiplexed and matrixed to obtain the signals u and z at the frequency of 13.5 MHz.

The matrix relation, previously described in reference to FIG. 2a, can be written:

$$\begin{pmatrix} u \\ z \end{pmatrix} = \begin{pmatrix} \cos(\beta)\sin(\beta) \\ -\sin(\beta)\cos(\beta) \end{pmatrix} \begin{pmatrix} cb \\ cr \end{pmatrix}$$

The luminance samples ys of the subject video source Vs are delayed by a delay 19 and output as delayed luminance samples y. The samples are delayed so as to compensate for the delay suffered by the chrominance samples cbs and crs in the course of the interpolation operator 10 and horizontal rotation operator 11. In order that the luminance cue y have a format identical to the chrominance cues cb, cr, the luminance samples are translated in scales so as to make the luminance zero correspond with the arithmetic zero and are coded over a number N of bits identical to that of the chrominance samples. The components cb, cr, y of each pixel are then transformed into components (u,v,w) by vertical rotation (see FIG. 2b) of angle γ in vertical rotation operator 12.

Within the vertical rotation operator 12, vertical rotation is performed according to the same principle as that described for the horizontal rotation.

In a first stage, the microprocessor loads cues sin(γ) and cos(γ) during field blanking while a multiplier calculates the products z x cos(γ), z x sin(γ), y x cos(γ) and y x sin(γ) during the active field. The cues z, y are provided at the frequency of 13.5 MHz. The cues cos(γ), sin(γ) are provided at the frequency of 27 MHz. It follows that at the output of the multiplier, the cues are multiplexed at the frequency of 27 MHz.

In a second stage, the multiplexed cues are demultiplexed 3. and matrixed to obtain the signals w and v at the frequency of 13.5 MHz. The matrix relation, previously described in reference to FIG. 2b, can be written as follows:

$$\begin{pmatrix} w \\ v \end{pmatrix} = \begin{pmatrix} \cos(\gamma)\sin(\gamma) \\ \sin(\gamma) - \cos(\gamma) \end{pmatrix} \begin{pmatrix} z \\ y \end{pmatrix}$$

FIG. 3 describes the operation of the calculation of the correction components operator 11.

During the vertical rotation operator 12, delays the signal w in such a way as to compensate for the processing time required for the calculation of the polar coordinates operator 13, which calculates coordinates r, θ.

The coordinates r and θ associated with each pixel are given by the formulae:

$$r = \sqrt{u^2 + v^2}$$

$$\theta(i) = (\vec{U}, \vec{OP(M)})$$

The coordinates r and θ are retrieved at the output of the calculation of the polar coordinates operator 13 so as to subsequently carry out elliptical modulation in elliptical modulation operator 14.

The elliptical modulation operator 14 is preferably carried out by calculating a modulating factor A for each pixel, for the duration of field blanking. This calculation is made with the aid of two adjustment parameters k and R, such as those mentioned while describing FIG. 5, it follows that:

$$A = \sqrt{k^2 \cos^2(\theta + R) + \sin^2(\theta + R)}$$

The factor k allows elliptical distortion of the chrominance distance r, and the angle R allows rotation of the elliptical section of the cone from 0 to π.

The elliptically modulated chrominance distance may then be written as $$r_e = r(A)^{1/2}.$$

The calculation of A is performed, for example, with the aid of EPROM memories hard-wired for this purpose. The dynamics of the multiplying of r by $(A)^{1/2}$ takes place over N bits, for example 16 bits, at the frequency of sampling of the luminance components, i.e. 13.5 MHz.

After elliptical modulation, the pixels are further processed with an "opening of the cone and defining of the clipping volume" operator 15, which employs parameters α, CLIP, GAIN, wb and wh. The conical aperture angle α as well as the chrominance distance threshold value CLIP are applied to the values $r_e$ and w of each pixel according to the rule stated previously with respect to FIG. 6, i.e.:

$$r_e - \alpha w = CLIP.$$

The parameter GAIN makes it possible to define the size of the transition region between the colored background and the subject as mentioned previously. Similarly, the parameters wb and wh represent the low luminance threshold and the high luminance threshold respectively, and allow delimitation of the volume of the colored background along the axis W.

Thus, an advantage of the invention is the easily adaptable nature of the volume defining the colored background. By defining the clipping volume, the chrominance key KC and the luminance key KL such as mentioned above may be generated.

Subsequently, in the combining of the keys operator 16, the keys KC and KL are combined so as to obtain the key KD allowing the clipping of the volume defining the colored background. As was mentioned earlier, it follows that:

$$KD = MAX [KC, KL].$$

The pixels for which KD=1 belong to the subject and those for which KD=0 belong to the colored background. For the pixels of the transition region, KD is between 0 and 1.

According to the preferred embodiment of the invention, the combining of the keys operator 16 is followed by a masking and filtering operator 17. The masking and filtering operator 17 as has been applied in other systems. When extracting the subject, details of which are likened to the colored background. The example most often encountered is the loss of colorimetry of the eyes of a person. By introducing the masking and filtering operator 17, then makes it possible to locally annul the level of the clipping. By way of example, the mask can be of rectangular shape and of adjustable size. It is, however, possible to use different shapes of mask arising from shape generators. Filtering of the clipping key makes it possible to eliminate the residues of color of the background of the subject video.

The final clipping key KDF for the subject arises from the masking and filtering operator 17. The key KDF is then applied in a known manner to a final mixing operator 170 in order to generate the image of the subject moving against the new background.

Figure 8:
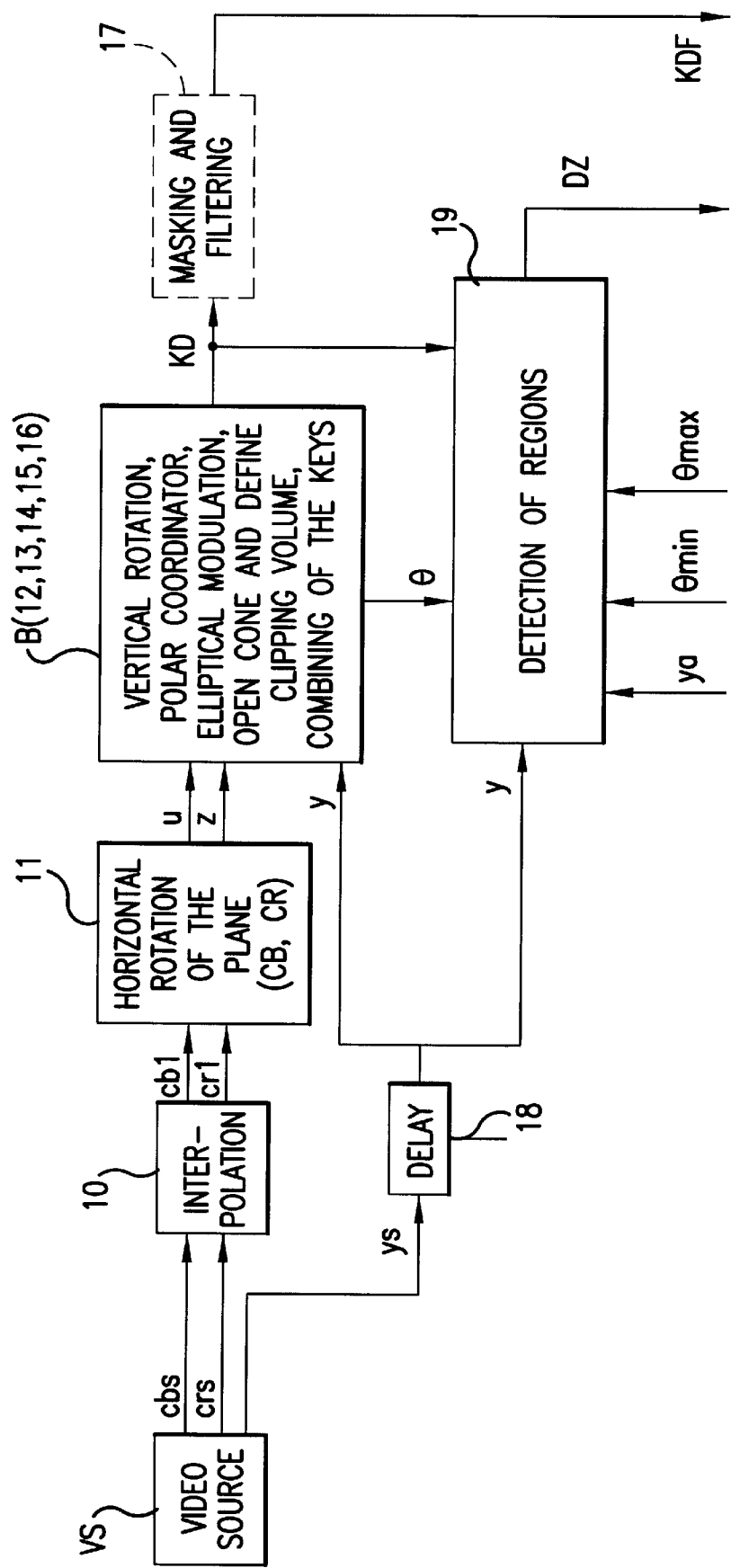
FIG. 8 is a block diagram of an enhanced device of the device shown in FIG. 7.

FIG. 8 is an enhancement of the device shown in FIG. 7. This enhancement relates to the generation of a region detection cue, DZ, that is output by a detection of regions operator 19. Advantageously, this enhancement allows detection of the shadow cast by the subject onto the colored background. The shadow cast is characterized by a luminance cue which is less than the mean luminance level of the colored background and has the same hue as that of the colored background.

According to the invention, the shadow cast can be blanked out or restored by attenuating the luminance of the new receiving background. In respect of the cue which allows clipping, the shadow is not part of the colored background. It must however be distinguished from the subject. Consequently, any pixel situated around the hue of the colored background, whose luminance value is less than a certain threshold and which belongs to the transition region 2 situated between the colored background 1 and the subject 3, is regarded as a shadow pixel.

Advantageously, the orientation and conical shape of the volume defining the colored background enable the shadow pixels to be entered into the transition region 2 separating the subject from the colored background.

Represented in FIG. 8 are the interpolation operator 10, the horizontal rotation operator 11, the delay operator 19 and the masking and filtering operator 17, as described in FIG. 7. For reasons of simplification, the operators 12, 13, 14, 15 and 16 are grouped together in the same block B.

According to the enhancement of the invention, the region detection operator 19 includes operations that allow for the detection of the shadow cast by the subject on the colored background. The luminance component y output by the delay operator 18 is compared with a luminance threshold value ya and the angular coordinate θ output by the operator 13 described in reference to FIG. 7 is compared with two values θmin and θmax whose difference θmax−θmin defines the angular aperture within which the angle θ must lie in order for the hue of the pixel associated with θ to be likened to the hue of the colored background. Any pixel whose value of θ is between θmin and θmax and whose luminance value y is less than ya is regarded as a shadow pixel.

As mentioned earlier, the shadow pixels are situated in the transition region 2 separating the subject from the colored background. Thus, the key KD is applied to the region detection operator 19 so as to furnish the cue making it possible to locate the pixels of the transition region 2. The signal DZ output by the region detection operator 19 then makes it possible to provide a cue for detecting shadow pixels according to the process mentioned above.

Figure 9:
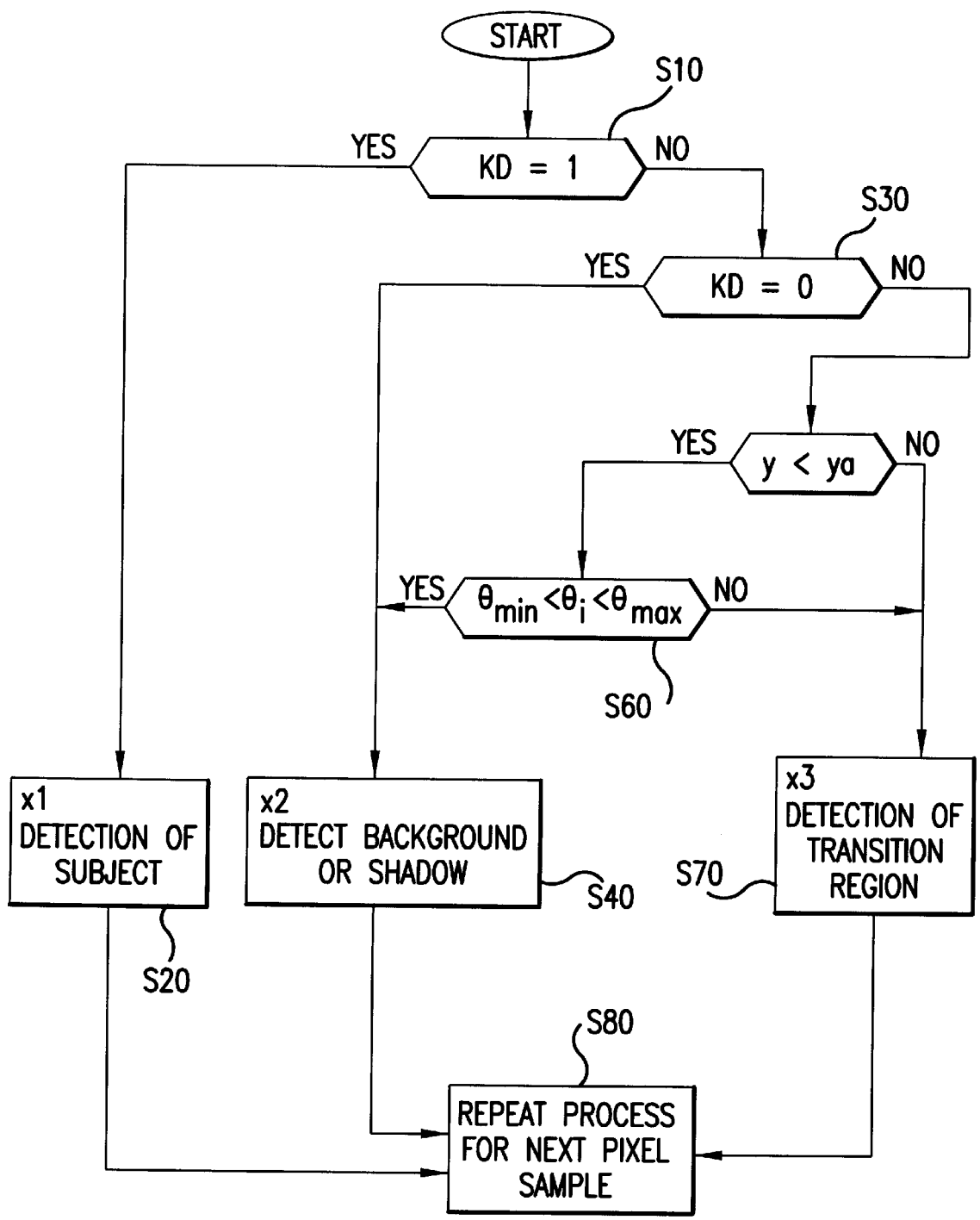
FIG. 9 is a flowchart showing a process flow performed by the device of FIG. 8.

As is apparent in FIG. 9, the signal DZ can supply not only a cue for locating the shadow pixels but also various cues making it possible to locate the pixels representing the subject video according to their position in the color space.

Represented in FIG. 9 are the various steps of the region detection operation 28 in the form of a flowchart in the case in which the signal DZ supplies all the cues making it possible to locate the pixels representing the source video image according to their position in the color space. However, the invention relates also to the cases in which DZ provides all or some of these cues.

The process starts in step S10 where an inquiry is made regarding whether the key KD has the value 1. If the response is affirmative, the process proceeds to step S20 where the cue DZ takes a value x1 signifying the detection of the subject, and then the process flows to step S80 where the process is repeated for the next pixel sample. If the response to the inquiry in step S10 is negative, the process flows to step S30.

In step S30 an inquiry is made regarding whether KD equals zero. If the response is affirmative, the process flows to step S40 where the cue DZ takes on a value x2 signifying the detection of the background, and then the process proceeds to step S80. However, if the response to the inquiry in step S30 is negative, the process flows to step S50.

In step S50 an inquiry is made regarding whether the luminance value y is less than the threshold value ya. If the response is negative the cue DZ takes a value x3 signifying the detection of the transition region between background and subject, and then the process flows to step S80. However, if the inquiry to step S50 is positive, the process flows to step S60.

In step S60 an inquiry is made regarding θ is between θmin and θmax. If the response is affirmative, the process flows to step S40 where the cue DZ takes a value signifying the detection of the shadow. Preferably, this value is equal to x2 so that the shadow pixels are processed like the pixels of the background. However, if the response to the inquiry in step S60 is affirmative, the process flows to step S70 indicating the cue DZ takes a value signifying the detection of the transition region between background and subject.

The present invention may also be implemented by the preparation of ASICs, FPGAs, or by interconnecting an appropriate network of conventional component circuits, as is described herein, modifications of which will be readily apparent to those skilled in the art(s).

The present invention thus also includes a computer product which may be a storage medium including instructions which can be used to program a computer to perform a process in accordance with the present invention. The storage medium can include, but is not limited to, any type of disk including floppy disk, optical disk, CD-ROMs, and magneto-optical disks, ROMs, RAMs, EPROMs, EEPROMs, Flash memory, magnetic or optical cards, or any type of media suitable for storing electronic instructions.

Obviously numerous modifications and variations of the present invention are possible in light of the above teachings. It is therefore to be understood that within the scope of the appended claims, the invention may be practiced otherwise than specifically described herein.

What is claimed as new and desired to be secured by Letters Patent of the United States is:

1. A method for determining a clipping key, KD, for clipping a subject from a first colored background and overlay the subject on a new colored background, comprising the steps of:

identifying a color space in which said subject and said first colored background are represented, said color space having an achromic and zero-luminance point;

defining a first volume as a first region in said color space corresponding to the first colored background, comprising the step of forming a cone having an aperture angle α with an axis of symmetry /W/ that passes through the achromic and zero-luminance point of the color space and a point representing a color of the first colored background;

defining a second volume in said color space that is separate from said first volume, said second volume including a second region representing said subject; and determining said clipping key based on at least one of said first volume and said second volume.

2. The method according to claim 1, wherein said step of defining a first volume comprises the step of:

defining a cross section of the cone in a plane (Uo, Vo) with polar coordinates r(i) and θ(i) for plural pixels (Mi), comprising the step of identifying a right-handed trihedral (Uo, Vo, W), that complies with an equation, $$k^2 r(i)^2 \cos^2(\theta(i)+R) + r(i)^2 \sin^2(\theta(i)+R) = \text{constant},$$

where θ(i) is a polar angle of respective of the plural pixels M(i), k is an elliptical modulation factor for the coordinate r(i), and R is an angle of rotation of the cross-section of the cone.

3. The method according to claim 2, wherein said step of defining a first volume comprises the steps of:

linking the aperture angle α with an adjustment parameter, CLIP, so that $r_e(i) - \alpha\, w(i) = \text{CLIP}$, where $$r_e(i) = r(i)\,(A)^{1/2},$$
$$A = \sqrt{k^2 \cos^2(\theta + R) + \sin^2(\theta + R)}$$

and w(i) is a coordinate on the axis of symmetry /W/ of the cone; and defining a face of the cone opposite a vertex of the cone aperture angle α with a coordinate wh on the axis of symmetry /w/ of the cone aperture angle α.

4. The method according to claim 2, wherein said step of defining a cross section of the cone defines the cone with the elliptical modulation factor k set in a range $1 \leq k \leq 2$, and the angle of rotation R set in a range from 0 to π.

5. The method according to claim 1, wherein the step of defining the second volume comprises the steps of:

defining as a third region a transition region between a surface of the cone of aperture angle α and another cone of aperture angle α1 greater than α that has the same axis of symmetry and the same vertex as the cone of aperture angle α, and having a face opposite the vertex and in the same plane as the face opposite the vertex of the cone of aperture angle α; and defining the subject region as being separate from the cone of aperture angle a and the another cone of aperture angle α1.

6. The method of claim 5, wherein said step of defining a transition region comprises the step of adjusting a size of the transition region with an adjustment parameter.

7. The method according to claim 1, wherein said step of forming a cone having an aperture angle α, comprises the step of truncating the cone having an aperture angle α at a distance, d, so as to separate a low luminance threshold region between a coordinate ws that defines a position of the vertex and axis of the cone of aperture angle α and a coordinate wb defining the low luminance threshold, where wb is positioned between ws and wh, and wh being an abscissa of a face opposite the vertex of the cone of aperture angle α.

8. The method according to claim 5, wherein said step of determining a clipping key comprises combining a chrominance key KC and a luminance key KL according to a formula,

KD=MAX [KC, KL], the luminance key KL having a value 1 when the pixel has a coordinate w(i) on the axis of symmetry W that is less than wb, and a value 0 for pixels having the coordinate w(i) that is greater than wh, and the chrominance key KC having a value 0 when the pixel belongs to the cone of aperture angle α and the value 1 when the pixel is situated beyond the cone of aperture angle α1.

9. The method according to claim 1, wherein said step of identifying a color space comprises converting into arithmetic zeros an origin of a frame of reference for the color space which corresponds to respective achromic levels of chrominance components of the color space and a zero level for a luminance component of the color space.

10. The method according to claim 1, further comprising the step of:

transposing a red color difference chrominance component and a blue difference chrominance component of the pixel into a common video format as a luminance component of the pixel, comprising the step of interpolating the red color difference component and the blue color difference component.

11. The method according to claim 10, further comprising the step of:

coding the red color difference chrominance component with N bits, the blue color difference chrominance component with N bits, and the luminance component of the pixel with bits N, where N is an integer greater than a number of bits of video bits for respective of said red color difference chrominance component, blue color difference chrominance component, and the luminance component.

12. The method according to claim 11, wherein said step of coding comprises coding with N equal to 16 bits among, said 16 bits comprising 10 video bits, 4 splitting bits intended to define the accuracy of the video, 1 sign bit and 1 overflow bit.

13. The method according to claim 5, further comprising the steps of:

detecting into which region of the first region, the second region, and the third region the pixel is located; and producing a signal DZ indicative of the respective region in which the pixel is located.

14. The method according to claim 13, wherein said detecting into which region step comprises detecting if the pixel is located in a shadow region.

15. The method according to claim 14, wherein said detecting into which region step comprises:

comparing a luminance value y corresponding to the pixel with a threshold value ya, if the clipping key, KD, is between 0 and 1;

assigning a first value to a signal DZ signifying that the pixel is located in the transition region, if the luminance value y is greater than the threshold value ya;

assigning a second value to the signal DZ signifying that the pixel is located in the shadow region if the luminance value y is less than threshold value ya and if a polar coordinate angle θ(i) corresponding to the pixel is between two values θmin and θmax whose difference θmax−θmin defines an angular aperture within which the angle θ(i) must lie in order for a hue of the pixel associated with θ(i) to be likened to a hue of the colored background; and assigning a third value to the signal DZ signifying the pixel is located in the transition region if the luminance value y is less than the threshold value ya and if the angle θ(i) is not between the said values θmin and θmax.

16. The method according to claim 1, wherein said step of determining said clipping key comprises masking and filtering the clipping key so as to provide a final clipping key /KDF/.

17. A device that forms a clipping key, KD, used to clip a subject moving against a first colored background and overlay the subject on a new colored background, comprising:

means for identifying a color space in which said subject and said first colored background are represented, said color space having an achromic and zero-luminance point;

means for defining a first volume comprising a first region corresponding to the first colored background, comprising means for forming a cone having an aperture angle α with an axis of symmetry /W/ that passes through the achromic and zero-luminance point of the color space and a point representing a color of the first colored background;

means for defining a second volume in said color space that is separate from said first volume, said second volume including a second region representing said subject; and means for determining said clipping key based on at least one of said first volume and said second volume.

18. The device of claim 17, further comprising means for elliptically modulating the cross-section of the cone of aperture angle $\alpha$.

19. The device of claim 17, wherein said means for defining a second volume comprises means for defining as a third region a transition region positioned between the first region and the second region in a space between a surface of the cone of aperture angle $\alpha$ and a cone of aperture angle $\alpha 1$ greater than $\alpha$, with the same axis of symmetry and the same vertex as the cone of aperture angle $\alpha$, said transition region having a face opposite the vertex and coplanar with a face opposite the vertex of the cone of aperture angle $\alpha$.

20. The device of claim 19, wherein said means for defining a first volume comprises means for truncating the cone of aperture angle $\alpha$ at a distance, d, so as to separate a low luminance threshold region between a coordinate ws that defines a position of the vertex and axis of the cone of aperture angle $\alpha$ and a coordinate wb defining the low luminance threshold, where wb is positioned between ws and wh, and wh being an abscissa of the face opposite the vertex.

21. The device of claim 17, further comprising:

means for detecting into which region of the first region, the second region, and the third region the pixel is located; and means producing a signal DZ indicative of the respective region in which the pixel is located.

22. The device according to claim 21, wherein:

said means for detecting detects if the pixel is located in a shadow region of the subject; and said means for producing produces the signal DZ indicative of the pixel being located in the shadow region when said means for detecting detects that the pixel is located in the shadow region.

23. The device of claim 17, further comprising means for overlaying the clipped subject onto the new colored background.

24. A video mixer configured to form a clipping key, KD, and use the clipping key, KD, to clip a subject from a first colored background and overlay the subject on a new colored background, comprising:

input means for inputting the source video image;

means for identifying a color space in which said subject and said first colored background are represented, said color space having an achromic and zero-luminance point;

means for defining a first volume in said color space comprising a first region corresponding to the first colored background, comprising means for forming a cone having an aperture angle $\alpha$ with an axis of symmetry /W/ that passes through the achromic and zero-luminance point of the color space and a point representing a color of the first colored background;

means for defining a second volume in said color space that is separate from said first volume, said second volume including a second region representing said subject;

means for determining said clipping key based on at least one of said first volume and said second volume; and mixing means for mixing the clipping key with the video source image.

25. An autonomous video image clipping and overlaying device, configured to form a clipping key, KD, and use the clipping key, KD, to clip a subject from a first colored background and overlay the subject on a new colored background, comprising:

input means for inputting the source video image;

means for identifying a color space in which said subject and said first colored background are represented, said color space having an achromic and zero-luminance point;

means for defining a first volume in said color space representing a first region corresponding to the first colored background, comprising means for forming a cone having an aperture angle $\alpha$ with an axis of symmetry /W/ that passes through the achromic and zero-luminance point of the color space and a point representing a color of the first colored background;

means for defining a second volume in said color space that is separate from said first volume, said second volume including a second region representing said subject;

means for determining said clipping key based on at least one of said first volume and said second volume;

means for extracting the subject from the source video image based on the clipping key, KD; and means for overlaying the subject on the new colored background.

* * * * *